(12) United States Patent
Kitayama et al.

(10) Patent No.: US 7,683,920 B2
(45) Date of Patent: Mar. 23, 2010

(54) IMAGE SENDING/RECEIVING DEVICE

(75) Inventors: Koji Kitayama, Neyagawa (JP);
Hiroyuki Fukuma, Neyagawa (JP)

(73) Assignee: Onkyo Corporation, Neyagawa-shi (JP)

( * ) Notice: Subject to any disclaimer, the term of this patent is extended or adjusted under 35 U.S.C. 154(b) by 917 days.

(21) Appl. No.: 11/424,256

(22) Filed: Jun. 15, 2006

(65) Prior Publication Data
US 2007/0070402 A1 Mar. 29, 2007

(30) Foreign Application Priority Data
Sep. 14, 2005 (JP) ............................. 2005-267698
Sep. 14, 2005 (JP) ............................. 2005-267699

(51) Int. Cl.
*H04N 7/01* (2006.01)
*G09G 5/02* (2006.01)

(52) U.S. Cl. ..................... 345/699; 345/698; 345/545; 345/546; 345/99; 345/204; 345/212; 345/213; 348/441; 348/459

(58) Field of Classification Search .................. 345/698, 345/699; 358/3.1, 3.12
See application file for complete search history.

(56) References Cited

U.S. PATENT DOCUMENTS

| | | | |
|---|---|---|---|
| 2002/0113907 A1 | 8/2002 | Endo et al. | |
| 2004/0046772 A1 | 3/2004 | Ouchi et al. | |
| 2005/0068346 A1* | 3/2005 | Ogawa et al. | ............... 345/699 |
| 2005/0080939 A1 | 4/2005 | Onuma et al. | |
| 2005/0128349 A1 | 6/2005 | Takamori et al. | |
| 2006/0001776 A1* | 1/2006 | Araki | .......................... 348/705 |
| 2006/0067654 A1* | 3/2006 | Herberger et al. | ........... 386/120 |

FOREIGN PATENT DOCUMENTS

| | | |
|---|---|---|
| JP | 11-015425 | 1/1999 |
| JP | 2002-006817 | 1/2002 |
| JP | 2002-318571 | 10/2002 |
| JP | 2003-195846 | 7/2003 |
| JP | 2004-102063 | 4/2004 |
| JP | 2004-102067 | 4/2004 |
| JP | 2004-170822 | 6/2004 |
| JP | 2005-109703 | 4/2005 |
| JP | 2005-167895 | 6/2005 |
| JP | 2005-341190 | 12/2005 |

* cited by examiner

*Primary Examiner*—Richard Hjerpe
*Assistant Examiner*—Olga Merkoulova
(74) *Attorney, Agent, or Firm*—Renner, Otto, Boisselle & Sklar, LLP

(57) ABSTRACT

An image sending/receiving device of the present invention includes: an image receiving section for receiving image data from an external image reproducing device connected to the image sending/receiving device; an image sending section for sending the image data to an external image display device connected to the image sending/receiving device; a first storage section for storing a set of resolutions to be read out by the image reproducing device; a second storage section in which a set of resolutions are pre-stored; a read-out section for reading out a set of resolutions pre-stored in the image display device from the image display device; and a resolution registration section for registering, in the first storage section, all of the resolutions read out by the read-out section or a subset of resolutions among those read out by the read-out section with which the image sending section is able to send data to the image display device.

9 Claims, 7 Drawing Sheets

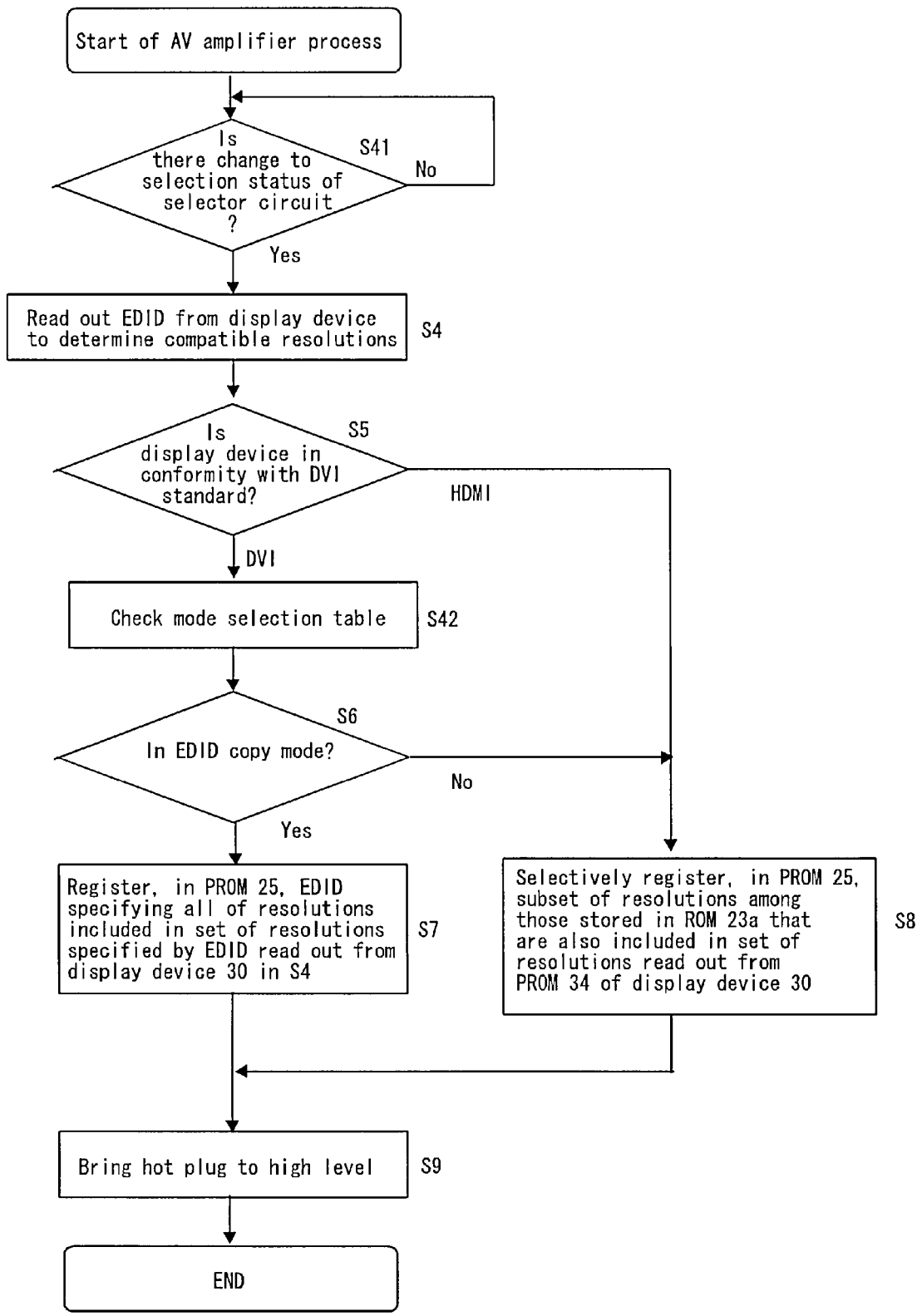

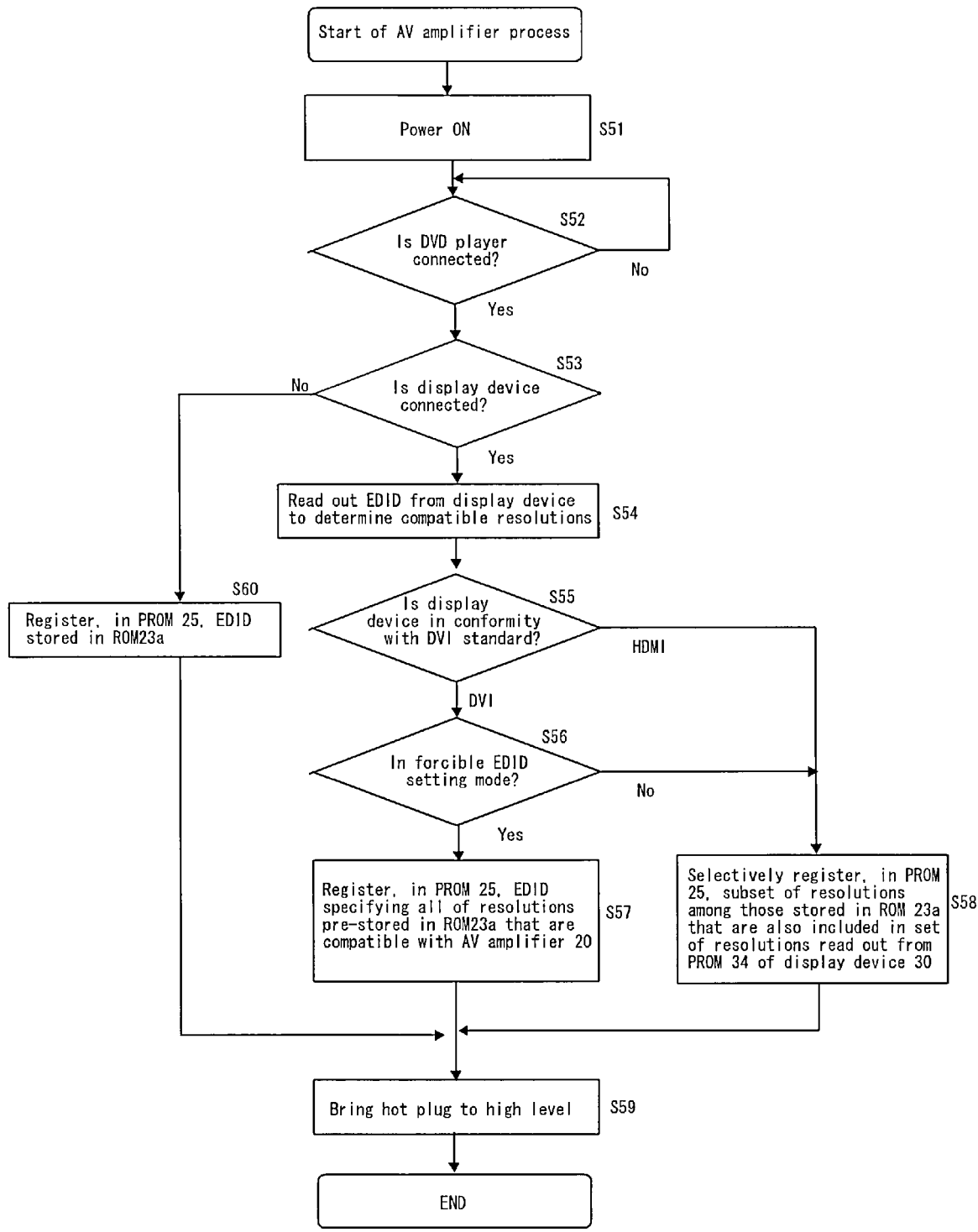

CONVENTIONAL ART

IMAGE SENDING/RECEIVING DEVICE

BACKGROUND OF THE INVENTION

1. Field of the Invention

The present invention relates to an image sending/receiving device for registering a set of resolutions with which an image reproducing device can output reproduced image, based on a set of resolutions read out from an image display device and another set of resolutions pre-stored in the image sending/receiving device.

2. Description of the Related Art

FIG. 6A shows a conventional system in which a DVD player, an AV amplifier and a display device, all conforming to the HDMI (High Definition Multimedia Interface) standard, are connected together via HDMI cables. The image data reproduced by the DVD player is output to the display device via the AV amplifier.

The display device can use different display resolutions, and EDID (Extended Display Identification Data) specifying a set of resolutions (e.g., "XGA", etc.) compatible with the display device is stored in a PROM (not shown) provided in the display device (Japanese Laid-Open Patent Publication No. 11-15425).

The AV amplifier also includes ROM therein storing a set of resolutions (which are all in conformity with the HDMI standard). The AV amplifier reads out the EDID from the display device to which it is connected, and identifies resolutions compatible with the display device from the EDID. The AV amplifier produces and registers new EDID in a PROM (not shown), wherein the new EDID specifies a subset of resolutions among those pre-stored in the ROM of the AV amplifier that are also included in the set of resolutions read out from the display device.

The DVD player reads out the EDID from the PROM of the AV amplifier to determine a set of resolutions that are available both to the AV amplifier and to the display device. The resolution of images to be output from the DVD player to the AV amplifier is specified by a user's operation based on the set of available resolutions. Specifically, the DVD player displays a resolution setting screen with a plurality of resolutions, and the user selects one of the resolutions. The resolutions displayed on the resolution setting screen are a set of resolutions that are included both in the resolutions pre-stored in the DVD player and in the resolutions read out from the PROM of the AV amplifier. Thus, it is possible to display on the resolution setting screen a set of resolutions that are available both to the AV amplifier and to the display device.

FIG. 6B shows a similar conventional system in which an AV amplifier is connected to a display device conforming to the DVI (Digital Visual Interface) standard (which is compatible with the HDMI standard) via a DVI cable. The AV amplifier reads out EDID from the display device, and the AV amplifier produces and registers new EDID in the PROM, the new EDID specifying a subset of resolutions among those pre-stored in the ROM of the AV amplifier that are also included in the set of resolutions specified by the EDID of the display device. The DVD player reads out the EDID from the PROM of the AV amplifier, and displays the set of resolutions included in the set of resolutions specified by the EDID on the resolution setting screen.

As described above, stored in the PROM of the AV amplifier is a set of resolutions that are stored both in the ROM of the AV amplifier and in the PROM of the display device. Therefore, a resolution that is compatible with the display device but is not stored in the ROM of the AV amplifier is not displayed on the resolution setting screen of the DVD player, and the DVD player cannot output image data in that resolution. This problem is common in cases where a display device of the DVI standard is connected to an AV amplifier of the HDMI standard. A display device of the DVI standard has a greater variety of resolutions than that of the HDMI standard.

For example, assume that the ROM of the AV amplifier stores resolutions a, b, c and d, and the PROM of the display device stores resolutions a, b, c, d, e and f. Then, only the common resolutions a, b, c and d are registered in the PROM of the AV amplifier, and the resolutions e and f are not registered. As a result, only the resolutions a, b, c and d are displayed on the resolution setting screen of the DVD player, and the resolutions e and f are not displayed therein. Therefore, it is not possible to select e or f as the resolution in which the DVD player outputs image data. Thus, even though the display device is capable of displaying images in the resolutions e and f, the DVD player cannot output image data in the resolutions e and f.

In the HDMI standard, an HDMI-sync display device is required to have all the available resolutions accurately pre-stored in the PROM in the display device. Therefore, when the DVD player displays the resolution setting screen based on the EDID read out by the AV amplifier from the display device, a set of resolutions compatible with the display device are accurately displayed on the resolution setting screen, and the user can select one of the resolutions compatible with the display device.

In the DVI standard, however, a display device is not required to have all the available resolutions accurately stored in the PROM. Therefore, a display device conforming to the DVI standard may have only some or none of the available resolutions stored in the PROM, due to PROM capacity limitations. Specifically, there may be one or more resolutions that are compatible with the display device but are not stored in the PROM. When such a display device is connected to an AV amplifier, the DVD player will display the resolution setting screen based on the EDID of the display device. Then, the resolutions compatible with the display device will not accurately be displayed on the resolution setting screen. As a result, there will be some resolutions that are compatible with the display device but cannot be selected as resolutions in which the DVD player outputs image data, whereby the DVD player cannot output image data in such resolutions.

SUMMARY OF THE INVENTION

An object of the present invention is to provide an AV amplifier that allows a DVD player to output image data with such a resolution that is compatible with a display device but is not stored in the AV amplifier.

An image sending/receiving device of the present invention includes: an image receiving section for receiving image data from an external image reproducing device connected to the image sending/receiving device; an image sending section for sending the image data to an external image display device connected to the image sending/receiving device; a first storage section for storing a set of resolutions to be read out by the image reproducing device; a second storage section in which a set of resolutions are pre-stored; a read-out section for reading out a set of resolutions pre-stored in the image display device from the image display device; and a resolution registration section for registering, in the first storage section, all of the resolutions read out by the read-out section or a subset of resolutions among those read out by the read-out section with which the image sending section is able to send data to the image display device.

In a preferred embodiment, the image sending/receiving device further includes a determining section for determining whether or not there is any resolution that is included in the set of resolutions read out by the read-out section from the image display device and is not stored in the second storage section; and if it is determined that there is any resolution that is included in the set of resolutions read out by the read-out section and is not stored in the second storage section, the resolution registration section registers, in the first storage section, all of the set of resolutions read out by the read-out section or a subset of resolutions among those read out by the read-out section with which the image sending section is able to send data to the image display device.

Another image sending/receiving device of the present invention is in conformity with a first standard, and includes: an image receiving section for receiving image data from an external image reproducing device connected to the image sending/receiving device; an image sending section for sending the image data to an external image display device connected to the image sending/receiving device; a first storage section for storing a set of resolutions to be read out by the image reproducing device; a second storage section in which a set of resolutions are pre-stored; a read-out section for reading out a set of resolutions pre-stored in the image display device from the image display device; a determining section for determining whether or not the image display device connected to the image sending/receiving device is in conformity with a second standard; and a resolution registration section for, if it is determined that the image display device is in conformity with the second standard, registering, in the first storage section, all of the set of resolutions read out by the read-out section or a subset of resolutions among those read out by the read-out section with which the image sending section is able to send data to the image display device.

In a preferred embodiment, if it is determined that the image display device is in conformity with the first standard, the resolution registration section registers, in the first storage section, a subset of resolutions among those stored in the second storage section that are included in the set of resolutions read out from the image display device.

In a preferred embodiment, the image sending/receiving device further includes: a mode setting section for selecting either a first mode or a second mode; and a mode determining section for determining a mode being selected by the mode setting section, wherein: if it is determined that the image display device is in conformity with the second standard and that the first mode is being selected, the resolution registration section registers, in the first storage section, all of the set of resolutions read out by the read-out section or a subset of resolutions among those read out by the read-out section with which the image sending section is able to send data to the image display device; and if it is determined that the image display device is in conformity with the second standard and that the second mode is being selected, the resolution registration section registers, in the first storage section, a subset of resolutions among those stored in the second storage section that are included in the set of resolutions read out from the image display device.

In a preferred embodiment, the image sending/receiving device further includes: a selecting section for selecting one of a plurality of image data sent from a plurality of image reproducing devices; a mode setting section for selecting either a first mode or a second mode according to a selection status of the selecting section; and a mode determining section for, when the selection status of the selecting section is changed to a new selection status, determining a mode associated with the new selection status, wherein: if it is determined that the new selection status is the first mode, the resolution registration section registers, in the first storage section, all of the set of resolutions read out by the read-out section or a subset of resolutions among those read out by the read-out section with which the image sending section is able to send data to the image display device; and if it is determined that the new selection status is the second mode, the resolution registration section registers, in the first storage section, a subset of resolutions among those stored in the second storage section that are included in the set of resolutions read out from the image display device.

In a preferred embodiment, the first standard is an HDMI standard and the second standard is a DVI standard.

The image sending/receiving device registers, in the first storage section, all of the set of resolutions read out from the image display device, irrespective of the resolutions pre-stored in the second storage section. Alternatively, the image sending/receiving device registers, in the first storage section, a subset of resolutions among those read out from the image display device with which the image sending section is able to send data (i.e., excluding resolutions corresponding to frequencies at which the image sending section is unable to send data). Therefore, even if there is any resolution that is compatible with the image display device but is not stored in the second storage section of the image sending/receiving device, it is possible to display, on the resolution setting screen of the image reproducing device, all of the resolutions that are compatible with the image display device to prompt the user to select one resolution. The image reproducing device can output image data with a resolution selected from among all resolutions that are compatible with the image display device.

Where the connected image display device is in conformity with the second standard, it is determined that there is at least one resolution that is compatible with the image display device but is not stored in the second storage section of the AV amplifier. Therefore, the image sending/receiving device registers, in the first storage section, all of the set of resolutions read out from the image display device, irrespective of the resolutions pre-stored in the second storage section. Alternatively, the image sending/receiving device registers, in the first storage section, a subset of resolutions among those read out from the image display device with which the image sending section is able to send data. Thus, similar effects to those described above can be obtained.

Another object of the present invention is to provide an AV amplifier with which, even if a display device in conformity with the DVI standard is connected to the AV amplifier, it is possible to display a set of resolutions compatible with the display device on the resolution setting screen of the DVD player, which is connected to the AV amplifier via an HDMI cable.

Such an image sending/receiving device of the present invention includes: an image receiving section for receiving image data from an external image reproducing device connected to the image sending/receiving device; an image sending section for sending the image data to an external image display device connected to the image sending/receiving device; a first storage section for storing a set of resolutions to be read out by the image reproducing device; a second storage section in which a set of resolutions are pre-stored; a read-out section for reading out a set of resolutions pre-stored in the image display device from the image display device; a determining section for determining whether or not the image display device connected to the image sending/receiving device is in conformity with a first standard; and a resolution registration section for, if it is determined that the image display device is in conformity with the first standard, registering, in the first storage section, all of the set of resolutions stored in the second storage section.

In a preferred embodiment, if it is determined by the determining section that the image display device is in conformity with a second standard, the resolution registration section registers, in the first storage section, a subset of resolutions among those stored in the second storage section that are included in the set of resolutions read out from the image display device.

In a preferred embodiment, the image sending/receiving device further includes: a mode setting section for selecting either a first mode or a second mode; and a mode determining section for determining a mode being selected by the mode setting section, wherein: if it is determined that the image display device is in conformity with the first standard and that the first mode is being selected, the resolution registration section registers, in the first storage section, all of the set of resolutions stored in the second storage section; and if it is determined that the image display device is in conformity with the first standard and that the second mode is being selected, the resolution registration section registers, in the first storage section, a subset of resolutions among those stored in the second storage section that are included in the set of resolutions read out from the image display device.

In a preferred embodiment, the first standard is a DVI standard and the second standard is an HDMI standard.

If the connected image display device is in conformity with the first standard, it is determined that a set of compatible resolutions are not accurately stored in the image display device. Therefore, the image sending/receiving device registers, in the first storage section, all of the resolutions pre-stored in the second storage section, irrespective of the resolutions read out from the image display device. The image reproducing device reads out the set of resolutions from the first storage section, and displays the resolution setting screen based on the set of resolutions. Therefore, even if a set of resolutions are not accurately stored in the image display device, it is possible to display, on the resolution setting screen of the image reproducing device, all of the resolutions stored in the image sending/receiving device and to have the user select a resolution from among all the resolutions. Thus, it is possible to prevent a problem where image data cannot be sent from the image reproducing device.

BRIEF DESCRIPTION OF THE DRAWINGS

FIG. 4 is a flow chart showing an operation of an AV amplifier according to a variation of the first embodiment.

FIG. 5 is a flow chart showing an operation of an AV amplifier of the second embodiment.

DETAILED DESCRIPTION OF THE PREFERRED EMBODIMENTS

A DVD player (the image reproducing device), an AV amplifier (the image sending/receiving device) and a display device (the image display device) according to a preferred embodiment of the present invention will now be described in detail with reference to the drawings. Note that the present invention is not limited to the preferred embodiments set forth below.

First Embodiment

Figure 1A:
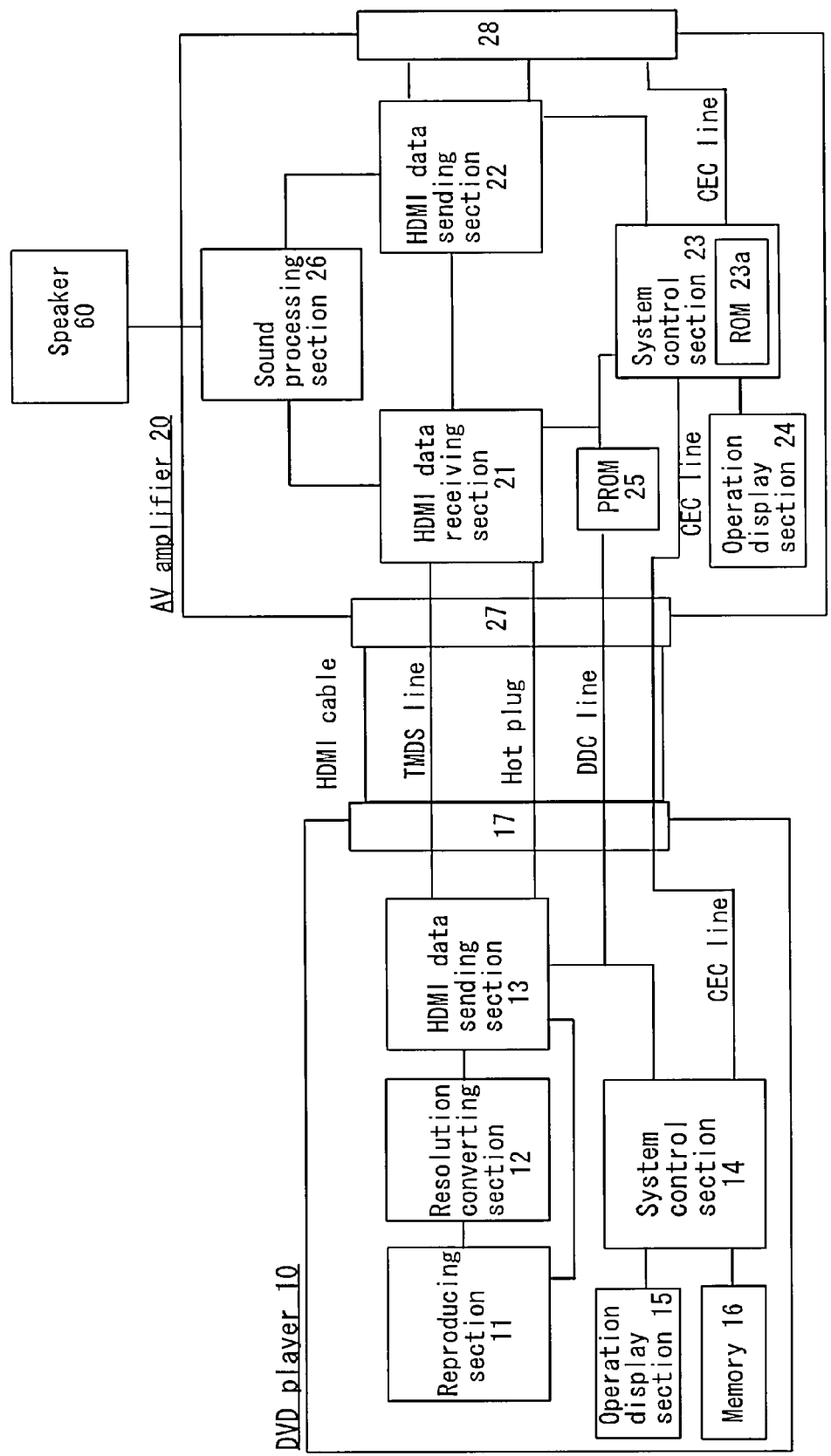
FIG. 1A is a block diagram showing a configuration of a DVD player 10 and an AV amplifier 20 according to a preferred embodiment of the present invention.
Figure 1B:
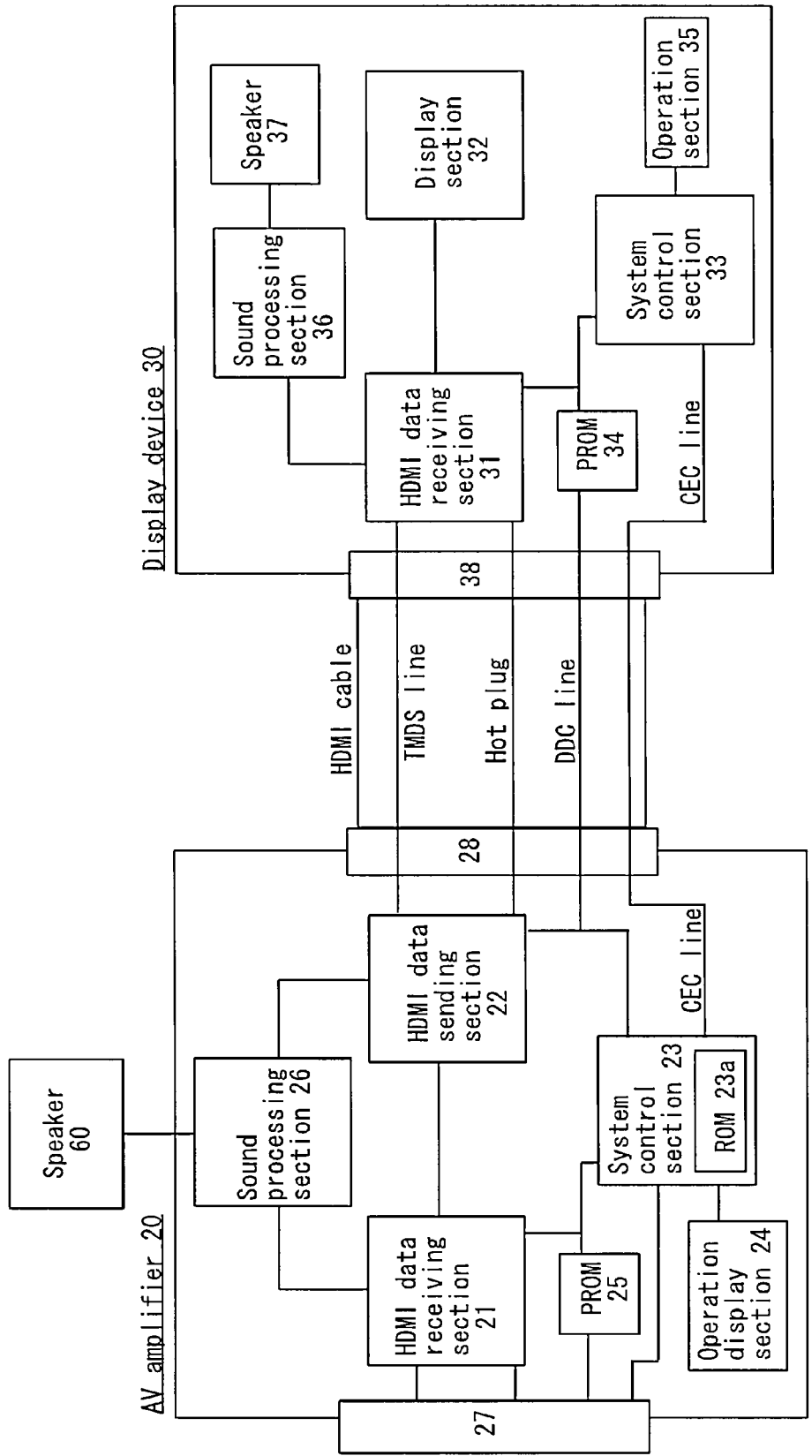
FIG. 1B is a block diagram showing a configuration of the AV amplifier 20 and a display device according to a preferred embodiment of the present invention.

FIG. 1A is a schematic block diagram showing a DVD player 10 and an AV amplifier 20, and FIG. 1B is a schematic block diagram showing the AV amplifier 20 (the same AV amplifier as that shown in FIG. 1A) and a display device 30. The DVD player 10 and the AV amplifier 20 are in conformity with the HDMI standard, and are connected to each other via an HDMI cable. The display device 30 is in conformity with the HDMI standard or the DVI standard, and is connected to the AV amplifier 20 via an HDMI cable when it is of the HDMI standard or a DVI cable when it is of the DVI standard.

First, a configuration of the DVD player 10 will be described. The DVD player 10 includes a reproducing section 11, a resolution converting section 12, an HDMI data sending section 13, a system control section 14, an operation display section 15, a memory 16, and a connector section 17.

The reproducing section 11 reads out and decodes image data from a DVD disc (hereinafter referred to simply as a "disc"), and supplies the decoded data to the resolution converting section 12. The reproducing section 11 also reads out and decodes sound data from the disc, and supplies the decoded data to the HDMI data sending section 13. The reproducing section 11 includes an optical pickup, a servo circuit, an MPEG decoder, etc., which are not shown in the figures.

The resolution converting section 12 identifies the resolution of the image data supplied from the reproducing section 11. According to a command from the system control section 14, the resolution converting section 12 converts the identified image data resolution to a resolution specified by the user. The image data, whose resolution has been converted by the resolution converting section 12, is supplied to the HDMI data sending section 13.

According to a command from the system control section 14, the HDMI data sending section 13 converts the image data supplied from the resolution converting section 12 and the sound data supplied from the reproducing section 11 to data of the HDMI standard (hereinafter referred to simply as "HDMI data"). The HDMI data sending section 13 sends the converted HDMI data to the AV amplifier 20 via the connector section 17.

Figure 2:
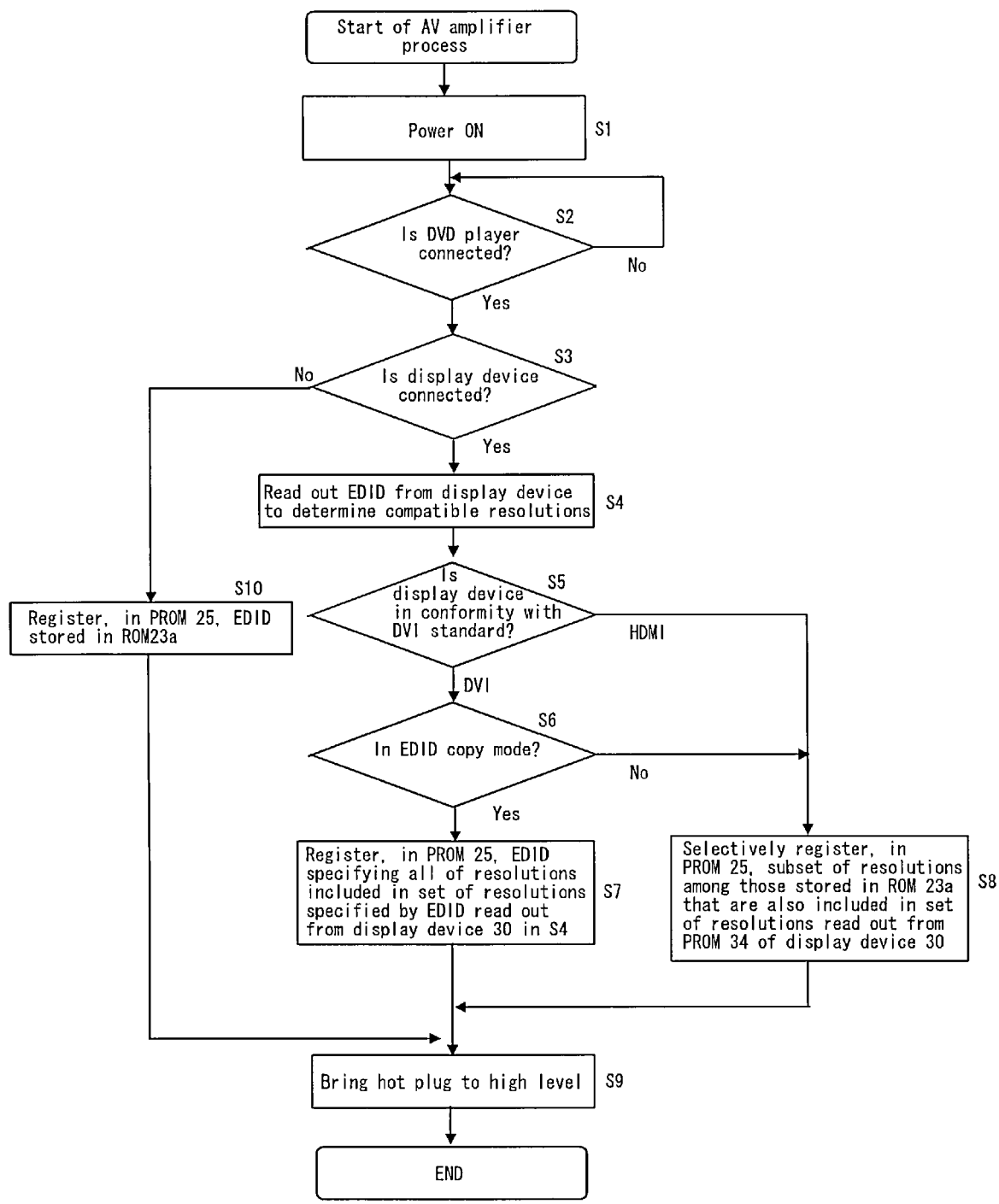
FIG. 2 is a flow chart showing an operation of an AV amplifier of a first embodiment.

The HDMI data sending section 13 is connected to an HDMI data receiving section 21 of the AV amplifier 20 via a TMDS line for carrying HDMI data (although a single line is shown in FIGS. 1A, 1B and 2, it is normally a plurality of lines) and a hot plug for determining the presence/absence of a connection.

The system control section 14 controls the reproducing section 11, the resolution converting section 12, the HDMI data sending section 13, the operation display section 15, the memory 16, etc., and may be, for example, a microcomputer. The system control section 14 performs various operations based on an operation input from the operation display section 15 or control signals and data from various sections.

The system control section 14 is connected to a system control section 23 of the AV amplifier 20 via a CEC line, and exchanges commands and/or data with the system control section 23. The system control section 14 is also connected to a PROM 25 of the AV amplifier 20 via a DDC line, and reads out the EDID stored in the PROM 25 to determine a set of resolutions specified by the EDID.

The system control section 14 displays a setup menu on the operation display section 15 for various initialization processes. The setup menu includes the resolution setting screen in which a resolution of image data to be output is specified by a user's operation. As a resolution is specified by the user, the system control section 14 sends a command to the resolution converting section 12 instructing to convert the image to the specified resolution.

Resolutions with which the DVD player 10 can output images to the AV amplifier 20 are pre-stored in the memory 16 (e.g., a ROM).

The system control section 14 reads out the resolutions stored in the PROM 25 of the AV amplifier 20 via the DDC line, and compares the resolutions with those pre-stored in the memory 16. The system control section 14 displays, in the resolution selecting screen, a subset of resolutions among those pre-stored in the memory 16 that are also included in the set of resolutions specified by the EDID read out from the PROM 25 of the AV amplifier 20.

A configuration of the AV amplifier 20 will now be described. The AV amplifier 20 includes the HDMI data receiving section 21, an HDMI data sending section 22, the system control section 23, an operation display section 24, the memory (an EDID PROM, hereinafter referred to as a "PROM") 25, a sound processing section 26, and connector sections 27 and 28.

The HDMI data receiving section 21 receives HDMI data sent from the DVD player 10, produces original image data (image data before the HDMI conversion) from the received HDMI data, and supplies the produced image data to the HDMI data sending section 22. The HDMI data receiving section 21 also produces original sound data from the received HDMI data, and supplies the produced sound data to the sound processing section 26.

The HDMI data sending section 22 converts, to HDMI data, the image data supplied from the HDMI data receiving section 21 and the sound data supplied from the sound processing section 26 as necessary, and sends the converted HDMI data to the display device 30 via the connector section 28. The HDMI data sending section 22 is connected to an HDMI data receiving section 31 of the display device 30 via a TMDS line and a hot plug.

The sound processing section 26 performs signal processing, amplification, D/A conversion, etc., on the sound data supplied from the HDMI data receiving section 21, and supplies the obtained sound signal to an external speaker 60 connected to the AV amplifier 20. As necessary, the sound processing section 26 supplies the sound data to the HDMI data sending section 22.

The system control section 23 controls the HDMI data receiving section 21, the HDMI data sending section 22, the operation display section 24, the PROM 25, the sound processing section 26, etc., and may be, for example, a microcomputer. The system control section 23 performs various operations based on an operation input from the operation display section 24 or control signals and data from various sections.

The system control section 23 is connected to the system control section 14 of the DVD player 10 via the CEC line, and exchanges commands and data with the system control section 14. The system control section 23 is also connected to a system control section 33 of the display device 30 via the CEC line, and exchanges commands and data with the system control section 33. The system control section 23 is connected to a PROM 34 of the display device 30 via the DDC line, and reads out the EDID from the PROM 34 specifying a set of resolutions compatible with the display device 30.

A memory 23*a* (e.g., a ROM) is provided in, or connected to, the system control section 23, and the resolutions with which images are output from the AV amplifier 20 are pre-stored in the ROM 23*a* (the resolutions may alternatively be stored in the PROM 25 instead of in the ROM 23*a*). Normally, the ROM 23*a* stores a plurality of resolutions in conformity with the HDMI standard.

The PROM 25 is connected to the system control section 14 of the DVD player 10 via the DDC line. EDID specifying a set of resolutions is registered by the system control section 23 in the PROM 25, and the registered EDID is read out by the system control section 14 of the DVD player 10 via the DDC line.

The system control section 23 has two modes of operation, i.e., a normal mode and an EDID copy mode, for registering the EDID read out by the DVD player 10 in the PROM 25.

In the normal mode, a subset of resolutions among those pre-stored in the ROM 23*a* that are also included in the set of resolutions specified by the EDID read out from the PROM 34 of the display device 30 are registered in the PROM 25. Thus, a set of resolutions that are stored both in the AV amplifier 20 and in the display device 30 are registered in the PROM 25.

Specifically, where the resolutions pre-stored in the ROM 23*a* of the AV amplifier 20 are a, b, c and d and the resolutions stored in the PROM 34 of the display device 30 are a, b, c, d, e and f, EDID specifying the resolutions a, b, c and d is registered in the PROM 25 in the normal mode.

In the EDID copy mode, all of the resolutions read out from the PROM 34 of the display device 30 are registered in the PROM 25, irrespective of the resolutions stored in the ROM 23*a*. Thus, the resolutions stored in the display device 30 are all registered in the PROM 25, irrespective of the resolutions stored in the AV amplifier 20.

Specifically, where the resolutions pre-stored in the ROM 23*a* of the AV amplifier 20 are a, b, c and d and the resolutions read out from the PROM 34 of the display device 30 are a, b, c, d, e and f, EDID specifying the resolutions a, b, c, d, e and f is registered in the PROM 25 in the EDID copy mode.

In the EDID copy mode, only a subset of resolutions among those read out from the PROM 34 of the display device 30 with which the HDMI data sending section 22 is able to send data to the display device 30 may be registered in the PROM 25. The phrase "the resolutions with which the HDMI data sending section 22 is able to send data to the display device 30" as used herein refers to resolutions corresponding to frequencies at which the HDMI data sending section 22 is able to convert and output image data, and includes all resolutions except for those corresponding to frequencies at which the HDMI data sending section 22 is unable to convert and output image data (e.g., the HDMI data sending section 22 is unable to convert and output image data with a resolution of a progressive-scan format, such as 1080 p). In this case, resolutions with which the HDMI data sending section 22 cannot output data are not registered in the PROM 25, whereby it is possible to prevent a problem where image data cannot be sent to the display device 30. While the following description is directed to a case where all of the resolutions stored in the display device 30 are registered in the PROM 25 in the EDID copy mode, the present invention can similarly be applied to a case where only a subset of resolutions among those stored in the display device 30 with which the HDMI data sending section 22 is able to send data to the display device 30 are registered in the PROM 25.

The normal mode or the EDID copy mode may be selected by the user. For example, a flag may be stored in a RAM (not shown) of the system control section 23, which may be set in the EDID copy mode and reset in the normal mode.

Where the display device 30 connected to the AV amplifier 20 is in conformity with the HDMI standard, the system control section 23 registers a set of resolutions in the PROM 25 in the normal mode. Where the display device 30 connected to the AV amplifier 20 is in conformity with the DVI standard, the system control section 23 registers a set of resolutions in the PROM 25 in the EDID copy mode if the EDID copy mode is being selected and in the normal mode if the normal mode is being selected.

A configuration of the display device 30 will now be described. The display device 30 may be a display device in conformity with the HDMI standard or a display device in conformity with the DVI standard. Where the display device 30 is in conformity with the HDMI standard, for example, the display device 30 includes the HDMI data receiving section 31, a display section 32, the system control section 33, the memory (an EDID PROM, hereinafter referred to as a "PROM") 34, an operation section 35, a sound processing section 36, a speaker 37, and a connector section 38.

The HDMI data receiving section 31 receives HDMI data sent from the HDMI data sending section 22 of the AV amplifier 20, produces original image data from the received HDMI data, and supplies the produced image data to the display section 32. The HDMI data receiving section 31 also produces original sound data from the received HDMI data, and supplies the produced sound data to the sound processing section 36.

The display section 32 receives image data from the HDMI data receiving section 31 and displays an image based on the image data, and may be, for example, an LCD, a CRT, or the like.

The sound processing section 36 performs signal processing, amplification, D/A conversion, etc., on the sound data supplied from the HDMI data receiving section 31, and supplies the obtained sound data to the speaker 37.

The system control section 33 controls the HDMI data receiving section 31, the display section 32, the PROM 23, the sound processing section 36, etc., and may be, for example, a microcomputer. The system control section 33 performs various operations based on an operation input from the operation section 35 or control signals and data from various sections.

The PROM 34 has EDID pre-stored therein specifying a set of resolutions compatible with the display section 32. The EDID is read out by the system control section 23 of the AV amplifier 20 via the DDC line.

Where the display device 30 is in conformity with the DVI standard, a DVI receiving section is provided in stead of the HDMI data receiving section 31. The DVI receiving section receives DVI data (DVI data does not include sound data and only includes image data), and supplies image data to the display section 32. A DVI cable is connected to a display device in conformity with the DVI standard, and the DVI cable is connected to an HDMI cable (which is connected to an AV amplifier) via a conversion connector.

An operation and function of a system having such a configuration will now be described with reference to FIG. 2. FIG. 2 is a flow chart showing the process of the AV amplifier 20. As the power of the AV amplifier 20 is turned ON (S1), the system control section 23 determines whether or not the DVD player 10 is connected to the connector section 27 (S2). If it is determined that the DVD player 10 is connected (YES in S2), the system control section 23 determines whether or not the display device 30 is connected to the connector section 28 (S3).

If it is determined that the display device 30 is connected (YES in S3), the system control section 23 reads out the EDID from the PROM 34 of the display device 30 via the DDC line (S4). The system control section 23 determines a set of resolutions compatible with the display device 30 based on the EDID.

Then, the system control section 23 determines whether the connected display device 30 is in conformity with the HDMI standard or the DVI standard (S5). Since the EDID read out from the PROM 34 contains information that specifies the standard of the display device, the system control section 23 can determine the standard of the display device 30 by analyzing the information.

If it is determined that the display device 30 is in conformity with the DVI standard (DVI in S5), the system control section 23 determines whether or not the EDID copy mode is being selected by checking the flag (S6).

If it is determined that the EDID copy mode is being selected (YES in S6), the system control section 23 registers, in the PROM 25, EDID specifying all of the resolutions read out from the PROM 34 of the display device 30 in S4. Thus, the set of resolutions read out from the display device 30 are registered in the PROM 25, irrespective of the resolutions stored in the ROM 23a of the AV amplifier 20.

Then, the system control section 23 brings the hot plug on the side of the connector section 27 (the DVD player 10) to a high level, thereby prompting the DVD player 10 to read out EDID (S9). Thus, as it is determined that the hot plug has been brought to a high level, the system control section 14 of the DVD player 10 reads out the EDID from the PROM 25 via the DDC line to determine the resolutions stored in the PROM 25.

When the user gives an instruction to display the resolution setting screen, the system control section 14 of the DVD player 10 selectively displays, on the resolution setting screen, a subset of resolutions among those pre-stored in the memory 16 that are also stored in the PROM 25 of the AV amplifier 20. The DVD player 10 typically has all the resolutions, which may be used by devices connected to the DVD player 10, pre-stored in the memory 16. Therefore, it is typical that all of the resolutions stored in the PROM 25 of the AV amplifier 20 are displayed on the resolution setting screen. The user selects one of the resolutions displayed on the resolution setting screen.

Therefore, where the display device 30 of the DVI standard is connected to the AV amplifier 20 and the EDID copy mode is being selected, all of the resolutions stored in the display device 30 are displayed on the resolution setting screen of the DVD player 10, irrespective of the resolutions stored in the AV amplifier 20. Thus, even if there are resolutions that are compatible with the display device 30 but are not stored in the AV amplifier 20, it is possible to display all of the resolutions compatible with the display device 30 on the resolution setting screen of the DVD player 10.

Specifically, where the resolutions stored in the PROM 34 of the display device 30 of the DVI standard are a, b, c, d, e and f and the resolutions pre-stored in the ROM 23a of the AV amplifier 20 are a, b, c and d, all of the resolutions a, b, c, d, e and f stored in the PROM 34 of the display device 30 are displayed on the resolution setting screen in the EDID copy mode. Therefore, the DVD player 10 can output image data with the resolutions e and f, which are compatible with the display device 30 but are not stored in the AV amplifier 20.

Where the DVD player 10 outputs image data with the resolutions e and f (these resolutions are compatible only with the DVI standard), the HDMI data receiving section 21 of the AV amplifier 20 receives data, which contains only image data but does not contain sound data, via the HDMI cable, produces image data, and supplies the produced image data to the HDMI data sending section 22. The HDMI data sending section 22 receives the image data from the HDMI data receiving section 21, and sends the received data to the display device 30. Thus, even if image data is sent from the DVD player 10 with a resolution (e or f) that is not stored in the ROM 23a of the AV amplifier 20, the AV amplifier 20 can send the image data with the resolution e or f to the display device 30. Since the HDMI data sent to the AV amplifier 20 does not contain sound data, the AV amplifier 20 cannot supply a sound signal to the speaker 60 based on the HDMI data. In this case, it is necessary to send sound data from the DVD player 10 to the AV amplifier 20 via an IEEE1394 cable, or the like, for example.

If it is determined that the EDID copy mode is not being selected (NO in S6), the system control section 23 selectively registers, in the PROM 25, a subset of resolutions among those stored in the ROM 23a that are also included in the set of resolutions read out from the PROM 34 of the display device 30 (S8). Thus, only a set of resolutions that are stored both in the display device 30 and in the AV amplifier 20 are displayed on the resolution setting screen. As a result, the DVD player 10 cannot output image data with a resolution that is stored only in the display device 30.

If it is determined in S5 that the display device 30 is in conformity with the HDMI standard, the system control section 23 selectively registers, in the PROM 25, a subset of resolutions among those stored in the ROM 23a that are also included in the set of resolutions read out from the PROM 34 of the display device 30 (S8).

Thus, where the display device 30 of the HDMI standard is connected to the AV amplifier 20, EDID specifying a set of resolutions is registered in the PROM 25 in the normal mode, irrespective of the user's mode selection, for the following reason. If the display device 30 is of the HDMI standard, the AV amplifier 20 needs to output image data with a resolution that is stored both in the display device 30 and in the AV amplifier 20. Moreover, the display device 30 being of the HDMI standard means that the AV amplifier 20 and the display device 30 are both of the HDMI standard, whereby the resolutions compatible with the display device 30 are all included in the set of resolutions stored in the ROM 23a of the AV amplifier 20.

If it is determined in S3 that the display device 30 is not connected (NO in S3), the system control section 23 registers, in the PROM 25, all of the resolutions specified by the EDID stored in the ROM 23a (S10), and proceeds to S9.

As described above, with the AV amplifier 20 of the present embodiment, even if there are resolutions that are compatible with the display device 30 but are not stored in the AV amplifier 20, it is possible to display, on the resolution setting screen of the DVD player 10, all of the resolutions compatible with the display device 30.

Figure 3:
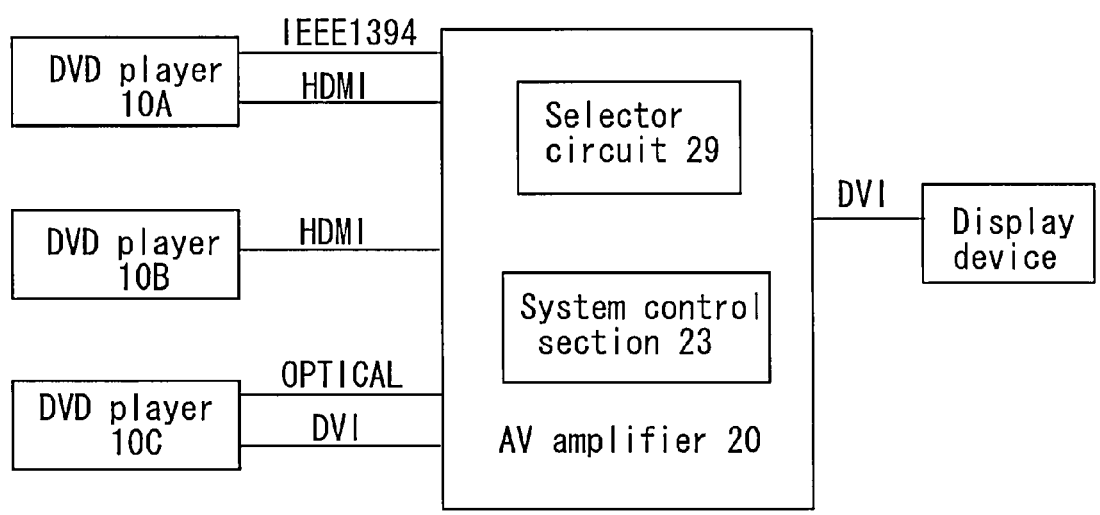
FIG. 3 is a block diagram showing a configuration according to a variation of the first embodiment.
Figure 6A:
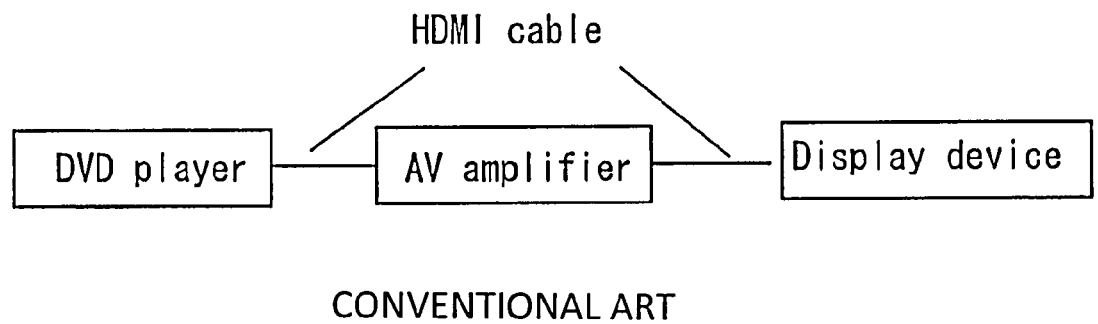
FIGS. 6A and 6B are block diagrams showing a conventional configuration.
Figure 6B:
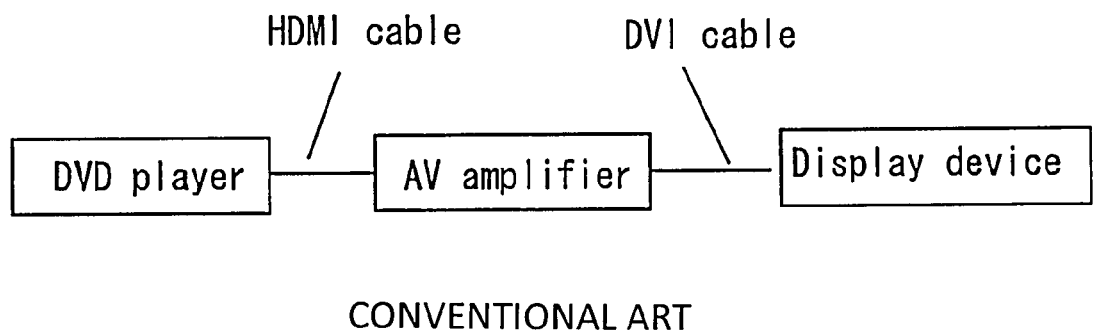

A variation of the first embodiment will now be described. Referring to FIG. 3, a plurality of DVD players (three DVD players 10A to 10C in the illustrated example) are connected to the AV amplifier 20. The DVD player 10A sends image data and sound data to the AV amplifier 20 via an HDMI cable and an IEEE1394 cable, respectively. The DVD player 10B sends image data and sound data to the AV amplifier 20 both via an HDMI cable. The DVD player 10C sends image data and sound data to the AV amplifier 20 via a DVI cable and an optical cable, respectively.

The AV amplifier 20 further includes a selector circuit 29 that selects one of three sets of image data and sound data, which are input from the DVD players 10A to 10C. The selector circuit 29 has a plurality of selection statuses ("selection statuses 1 to 3" in the illustrated example), wherein the selection statuses 1 to 3 are assigned to the input terminal for the DVD player 10A, the input terminal for the DVD player 10B and the input terminal for the DVD player 10C, respectively.

The system control section 23 has a mode setting table as shown in Table 1 below stored in a RAM (not shown) provided therein. The mode setting table defines whether EDID is registered in the PROM 25 in the normal mode or in the EDID copy mode for each of the selection statuses 1 to 3. The user can select the mode for each of the selection statuses 1 to 3.

TABLE 1

| Selection Status 1 | EDID Copy Mode |
| Selection Status 2 | Normal Mode |
| Selection Status 3 | EDID Copy Mode |

In this variation, every time the user changes the selection status of the selector circuit 29, the system control section 23 automatically re-registers EDID, in the PROM 25, that specifies an appropriate set of resolutions. For example, referring to Table 1, when the selection status of the selector circuit 29 is changed from the selection status 1 to the selection status 2, the system control section 23 registers EDID in the PROM 25 in the normal mode.

This operation will now be described with reference to the flow chart of FIG. 4. Like steps to those of FIG. 2 will be denoted by the same step numbers, and will be described only briefly or will not be described at all below. The system control section 23 constantly checks if there is a change to the selection status of the selector circuit 29 (S41). If it is determined that there is a change to the selection status of the selector circuit 29 (YES in S41), the system control section 23 reads out the EDID from the PROM 34 of the display device 30 (S4). Then, if the display device 30 is in conformity with the DVI standard (DVI in S5), the system control section 23 refers to the mode setting table of Table 1 to determine the mode associated with the new selection status (S42). If the mode associated with the new selection status is the EDID copy mode (YES in S6), EDID is registered in the PROM 25 in the EDID copy mode. If the mode is the normal mode (NO in S6), EDID is registered in the PROM 25 in the normal mode.

As described above, the mode for each selection status of the selector circuit 29 is determined in advance, based on which EDID is automatically re-registered in the PROM 25 when the selection status is changed. Therefore, it is possible to re-register EDID in the PROM 25 without having the user perform an EDID setting operation and without having to once turn OFF the power of the AV amplifier.

As described above, every time the selection status of the selector circuit 29 is changed, a set of resolutions are re-registered in the PROM 25. Thus, where the DVD players 10A to 10C are connected to the AV amplifier 20 as shown in FIG. 3, it is possible to display, on the resolution setting screen, an appropriate set of resolutions for any DVD player being selected.

Specifically, where the DVD player 10A (the selection status 1) is being selected by the selector circuit 29, if the display device 30 of the DVI standard is connected to the AV amplifier 20, EDID is registered in the PROM 25 in the EDID copy mode as shown in Table 1. In this case, if a resolution that is compatible only with the DVI standard is selected in the resolution selecting screen, the DVD player 10A cannot send sound data via the HDMI cable. However, since sound data is sent by IEEE1394, the AV amplifier 20 will not be unable to supply sound signal to the speaker 60.

Where the DVD player 10B (the selection status 2) is being selected by the selector circuit 29, if the display device 30 of the DVI standard is connected to the AV amplifier 20, EDID is registered in the PROM 25 in the normal mode as shown in Table 1. The DVD player 10B sends image data and sound data via the HDMI cable. Therefore, if a resolution that is compatible only with the DVI standard is selected in the resolution selecting screen, the DVD player 10A will no longer be able to send sound data via the HDMI cable. Where the DVD player 10B is being selected, this problem can be avoided by registering EDID in the PROM 25 in the normal mode.

Another variation will now be described. In this variation, instead of determining in S5 of FIG. 2 whether or not the display device 30 is in conformity with the DVI standard, the set of resolutions read out from the display device 30 in S4 are compared with the set of resolutions stored in the ROM 23a so as to determine whether or not there is any resolution that is stored in the display device 30 but is not stored in the ROM 23a. If there is any resolution that is stored in the display device 30 but is not stored in the ROM 23a, the process proceeds to S7, and to S8 otherwise. In this case, even where the display device 30 is in conformity with the HDMI standard, if there is any resolution that is stored in the display device 30 but is not stored in the ROM 23a of the AV amplifier 20 (where the EDID copy mode is being selected), an appropriate set of resolutions are registered in the PROM 25 in the EDID copy mode.

For example, assume a case where the AV amplifier 20 and the display device 30 are both in conformity with the HDMI standard, the resolutions stored in the ROM 23a of the AV amplifier 20 are a, b, c and d, and the resolutions stored in the PROM 34 of the display device 30 are a, b, c, d, e and f. Then, a set of resolutions a, b, c, d, e and f are registered in the PROM 25 of the AV amplifier 20. Therefore, the DVD player 10 can output image data with any of the resolutions a, b, c, d, e and f.

EDID may be registered in the PROM 25 in the EDID copy mode when the display device is in conformity with the HDMI standard.

Second Embodiment

A second embodiment of the present invention will now be described below. The basic configuration is the same as that of the first embodiment shown in FIGS. 1A and 1B, and will not be further described below. Only what is different from the first embodiment will be described below.

The system control section 23 has two modes of operation, i.e., a normal mode and a forcible EDID setting mode, for registering the EDID read out by the DVD player 10 in the PROM 25.

In the normal mode, a subset of resolutions among those pre-stored in the ROM 23a that are also included in the set of resolutions specified by the EDID read out from the PROM 34 of the display device 30 are registered in the PROM 25. Thus, a set of resolutions that are stored both in the AV amplifier 20 and in the display device 30 are registered in the PROM 25.

Specifically, where the resolutions pre-stored in the ROM 23a of the AV amplifier 20 are a, b, c and d and the resolutions stored in the PROM 34 of the display device 30 are a, e and f, EDID specifying the resolution a is registered in the PROM 25 in the normal mode.

In the forcible EDID copy mode, all of the resolutions stored in the ROM 23a are registered in the PROM 25, irrespective of the resolutions read out from the PROM 34 of the display device 30. Thus, the resolutions stored in the AV amplifier 20 are registered in the PROM 25, irrespective of the resolutions of the display device 30.

Specifically, where the resolutions pre-stored in the ROM 23a of the AV amplifier 20 are a, b, c and d and the resolutions specified by the EDID read out from the PROM 34 of the display device 30 are a, e and f, EDID specifying the resolutions a, b, c and d is registered in the PROM 25 in the forcible EDID setting mode.

The normal mode or the forcible EDID setting mode may be selected by the user. For example, a flag may be stored in a RAM (not shown) of the system control section 23, which may be set in the forcible EDID copy mode and reset in the normal mode.

Where the display device 30 connected to the AV amplifier 20 is in conformity with the HDMI standard, the system control section 23 registers a set of resolutions in the PROM 25 in the normal mode. Where the display device 30 connected to the AV amplifier 20 is in conformity with the DVI standard, the system control section 23 registers a set of resolutions in the PROM 25 in the forcible EDID copy mode if the forcible EDID copy mode is being selected and in the normal mode if the normal mode is being selected.

A display device of the DVI standard does not always store, in the PROM 23, all the resolutions compatible with the display section 32. Normally, only some or none of those resolutions are stored.

An operation and function of a system having such a configuration will now be described with reference to FIG. 5. FIG. 5 is a flow chart showing the process of the AV amplifier 20. As the power of the AV amplifier 20 is turned ON (S51), the system control section 23 determines whether or not the DVD player 10 is connected to the connector section 27 (S52). If it is determined that the DVD player 10 is connected (YES in S52), the system control section 23 determines whether or not the display device 30 is connected to the connector section 28 (S53).

If it is determined that the display device 30 is connected (YES in S53), the system control section 23 reads out the EDID from the PROM 34 of the display device 30 via the DDC line (S54). The system control section 23 determines a set of resolutions compatible with the display device 30 based on the EDID.

Then, the system control section 23 determines whether the connected display device 30 is in conformity with the HDMI standard or the DVI standard (S55). Since the EDID read out from the PROM 34 contains information that specifies the standard of the display device, the system control section 23 can determine the standard of the display device 30 by analyzing the information.

If it is determined that the display device 30 is in conformity with the DVI standard (DVI in S55), the system control section 23 determines whether or not the forcible EDID setting mode is being selected by checking the flag (S56).

If it is determined that the forcible EDID setting mode is being selected (YES in S56), the system control section 23 extracts all of the resolutions pre-stored in the ROM 23a and registers EDID specifying these resolutions in the PROM 25. Thus, irrespective of the resolutions read out from the PROM 34 of the display device 30 in S4, the set of resolutions stored in the AV amplifier 20 are registered in the PROM 25.

Then, the system control section 23 brings the hot plug on the side of the connector section 27 (the DVD player 10) to a high level, thereby prompting the DVD player 10 to read out EDID (S59). Thus, as it is determined that the hot plug has been brought to a high level, the system control section 14 of the DVD player 10 reads out the EDID from the PROM 25 via the DDC line to determine the resolutions stored in the PROM 25.

When the user gives an instruction to display the resolution setting screen, the system control section 14 of the DVD player 10 selectively displays, on the resolution setting screen, a subset of resolutions among those pre-stored in the memory 16 that are also stored in the PROM 25 of the AV amplifier 20. The DVD player 10 typically has all the resolutions, which may be used by devices connected to the DVD player 10, pre-stored in the memory 16. Therefore, it is typical that all of the resolutions stored in the PROM 25 of the AV amplifier 20 are displayed on the resolution setting screen. The user selects one of the resolutions displayed on the resolution setting screen. The system control section 14 notifies the resolution converting section 12 of the resolution selected by the user, and the resolution converting section 12 converts an image to the resolution selected by the user and outputs the converted image.

Thus, where the display device 30 of the DVI standard is connected to the AV amplifier 20 and the forcible EDID setting mode is being selected, all of the resolutions stored in the AV amplifier 20 are displayed on the resolution setting screen of the display device 30, irrespective of the resolutions stored in the display device 30. Therefore, even if the display device 30 of the DVI standard does not accurately (or does not at all) store the compatible resolutions in the PROM 23, it is possible to display a set of resolutions stored in the AV amplifier 20 on the resolution setting screen of the DVD player 10. Since most of the resolutions stored in the AV amplifier 20 are compatible with the display device 30, the resolutions compatible with the display device 30 can be displayed on the resolution setting screen, and one of the resolutions can be selected as the resolution with which data is output from the DVD player 10.

Specifically, where the resolutions compatible with the display device 30 (of the DVI standard) are a, b, c, d, e and f, only the resolutions a, e and f are stored in the PROM 34 of the display device 30, and the resolutions pre-stored in the ROM 23a of the AV amplifier 20 are a, b, c and d, the common resolution a will only be displayed on the resolution setting screen in the normal mode. While the resolutions b, c and d are also stored in the AV amplifier 20 and compatible with the display device 30, these resolutions will not be displayed on the resolution setting screen and image data cannot be output with these resolutions.

While the resolutions a, b, c and d, which are pre-stored in the ROM 23a of the AV amplifier 20, are displayed on the resolution setting screen in the forcible EDID setting mode, these resolutions are all compatible with the display device 30. Therefore, even if the display device 30 is in conformity with the DVI standard and the compatible resolutions are not accurately stored in the PROM 23, it is possible to select a desired resolution among the resolutions a, b, c and d compatible with the display device 30.

If it is determined that the forcible EDID setting mode is not being selected (NO in S56), the system control section 23 selectively registers, in the PROM 25, a subset of resolutions among those stored in the ROM 23a that are also included in the set of resolutions read out from the PROM 34 of the display device 30 (S58).

If it is determined in S55 that the display device 30 is in conformity with the HDMI standard, the system control section 23 selectively registers, in the PROM 25, a subset of resolutions among those stored in the ROM 23a that are also included in the set of resolutions read out from the PROM 34 of the display device 30 (S58).

Thus, where the display device 30 of the HDMI standard is connected to the AV amplifier 20, EDID specifying a set of resolutions is automatically registered in the PROM 25 in the normal mode, for the following reason. If the display device 30 is of the HDMI standard, all of the resolutions compatible with the display device 30 are always stored in the PROM 23, whereby it is not necessary to register a set of resolutions in the PROM 25 in the forcible EDID setting mode. Moreover, if the display device 30 of the HDMI standard is connected to the AV amplifier 20, the AV amplifier 20 needs to output image data with a resolution that is stored both in the display device 30 and in the AV amplifier 20.

Specifically, where the resolutions compatible with the display device 30 (of the HDMI standard) are a, b, c, d, e and f (where the resolutions a, b, c, d, e and f are stored in the PROM 34) and the resolutions pre-stored in the ROM 23a of the AV amplifier 20 are a, b, c and d, image data is output with a resolution selected from among the common resolutions a, b, c and d.

If it is determined in S53 that the display device 30 is not connected (NO in S53), the system control section 23 registers, in the PROM 25, all of the resolutions specified by the EDID stored in the ROM 23a (S60), and proceeds to S59.

As described above, with the AV amplifier 20 of the present embodiment, even if the display device 30 of the DVI standard is connected to the AV amplifier 20, it is possible to output image data to the DVD player 10 with a resolution selected from among the set of resolutions stored in the AV amplifier 20.

While the operation after the power of the AV amplifier 20 is turned ON is illustrated in FIG. 5, the steps from S54 to S58 are similarly performed when the user switches from one of the forcible EDID setting mode and the normal mode to another. Moreover, where the AV amplifier 20 includes a plurality of input terminals and a selector circuit for selecting one image data from among all the image data input via the plurality of input terminals, the steps from S54 to S58 may be performed when the selector is switched from one position to another.

The present invention is not limited to the preferred embodiments set forth above. The present invention can also be presented in the form of a program, and a storage medium storing the same, for instructing a computer to perform the above-described operations of the DVD player, the AV amplifier and the display device.

What is claimed is:

1. An amplifier device conforming to a standard comprising a set of resolutions with which image data is output from the amplifier device, and connectable to an image reproducing device and an image display device, the amplifier device comprising:

an image receiving section for receiving image data from the image reproducing device;

an image sending section for sending the image data to the image display device;

a first storage section for storing a set of resolutions to be read out by the image reproducing device;

a second storage section in which the set of resolutions belonging to the standard of the amplifier device is pre-stored;

a read-out section for reading out a set of resolutions pre-stored in the image display device from the image display device;

a determining section for determining whether or not the image display device connected to the amplifier device conforms to the standard of the amplifier device; and a resolution registration section for,
if it is determined that the image display device does not conform to the standard of the amplifier device, registering in the first storage section all of the resolutions of the image display device read out by the read-out section or a subset of resolutions of the image display device among those read out by the read-out section with which the image sending section is able to send data to the image display device, ignoring the resolutions of the amplifier device stored in the second storage section, and if it is determined that the image display device conforms to the standard of the amplifier device, registering in the first storage section a subset of resolutions among those stored in the second storage section that are included in the set of resolutions read out from the image display device.

2. The amplifier device according to claim 1, further comprising:

a mode setting section for selecting either a first mode or a second mode; and a mode determining section for determining a mode being selected by the mode setting section, wherein:

if it is determined that the image display device does not conform to the standard of the amplifier device and that the first mode is being selected, the resolution registration section registers, in the first storage section, all of the set of resolutions read out by the read-out section or a subset of resolutions among those read out by the read-out section with which the image sending section is able to send data to the image display device; and if it is determined that the image display device does not conform to the standard of the amplifier device and that the second mode is being selected, the resolution registration section registers, in the first storage section, a subset of resolutions among those stored in the second storage section that are included in the set of resolutions read out from the image display device.

3. The amplifier device according to claim 1, further comprising:

a selecting section for selecting one of a plurality of image data sent from a plurality of image reproducing devices;

a mode setting section for selecting either a first mode or a second mode according to a selection status of the selecting section; and a mode determining section for, when the selection status of the selecting section is changed to a new selection status, determining a mode associated with the new selection status, wherein:

if it is determined that the new selection status is the first mode, the resolution registration section registers, in the first storage section, all of the set of resolutions read out by the read-out section or a subset of resolutions among those read out by the read-out section with which the image sending section is able to send data to the image display device; and if it is determined that the new selection status is the second mode, the resolution registration section registers, in the first storage section, a subset of resolutions among those stored in the second storage section that are included in the set of resolutions read out from the image display device.

4. The amplifier device according to claim 1, wherein the standard of the amplifier device is an HDMI standard and the standard of the image display device is a DVI standard.

5. An amplifier device conforming to a standard comprising a set of resolutions with which image data is output from the amplifier device, and connectable to an image reproducing device and an image display device, the amplifier device comprising:

an image receiving section for receiving image data from the image reproducing device;

an image sending section for sending the image data to the image display device;

a first storage section for storing a set of resolutions to be read out by the image reproducing device;

a second storage section in which the set of resolutions belonging to the standard of the amplifier device is pre-stored;

a read-out section for reading out a set of resolutions pre-stored in the image display device from the image display device;

a determining section for determining whether or not the image display device connected to the amplifier device conforms to the standard of the amplifier device; and a resolution registration section for,
if it is determined that the image display device does not conform to the standard of the amplifier device, registering in the first storage section all of the set of resolutions stored in the second storage section, ignoring the resolutions read out by the read-out section, and if it is determined that the image display device conforms to the standard of the amplifier device, registering in the first storage section, a subset of resolutions among those stored in the second storage section that are included in the set of resolutions read out from the image display device.

6. The amplifier device according to claim 5, further comprising:

a mode setting section for selecting either a first mode or a second mode; and a mode determining section for determining a mode being selected by the mode setting section, wherein:

if it is determined that the image display device does not conform to the standard of the amplifier device and that the first mode is being selected, the resolution registration section registers, in the first storage section, all of the set of resolutions stored in the second storage section; and if it is determined that the image display device conforms to the standard of the amplifier device and that the second mode is being selected, the resolution registration section registers, in the first storage section, a subset of resolutions among those stored in the second storage section that are included in the set of resolutions read out from the image display device.

7. The amplifier device according to claim 5, wherein the standard of the amplifier device is an HDMI standard and the standard of the image display device is a DVI standard.

8. An amplifier device connectable to an image reproducing device and an image display device, comprising:

an image receiving section for receiving image data from the image reproducing device;

an image sending section for sending the image data to the image display device;

a first storage section for storing a set of resolutions to be read out by the image reproducing device;

a second storage section in which a set of resolutions with which image data is output from the amplifier device are pre-stored;

a read-out section for reading out a set of resolutions pre-stored in the image display device from the image display device;

a determining section for determining whether or not there is any resolution that is included in the set of resolutions read out by the read-out section from the image display device but is not stored in the second storage section; and a resolution registration section for, if it is determined that there is any resolution that is included in the set of resolutions read out by the read-out section but is not stored in the second storage section, registering in the first storage section, all of the resolutions read out by the read-out section or a subset of resolutions among those read out by the read-out section with which the image sending section is able to send data to the image display device, with ignoring the resolutions stored in the second storage section, and if it is determined that there is not any resolution that is included in the set of resolutions read out by the read-out section but is not stored in the second storage section, registering in the first storage section, a subset of resolutions among those stored in the second storage section that are included in the set of resolutions read out from the image display device.

9. The amplifier device according to claim 8, further comprising:

a mode setting section for selecting either a first mode or a second mode; and a mode determining section for determining a mode being selected by the mode setting section, wherein:

if it is determined that there is any resolution that is included in the set of resolutions read out by the read-out section but is not stored in the second storage section and that the first mode is being selected, the resolution registration section registers, in the first storage section, all of the set of resolutions read out by the read-out section or a subset of resolutions among those read out by the read-out section with which the image sending section is able to send data to the image display device; and if it is determined that there is any resolution that is included in the set of resolutions read out by the read-out section but is not stored in the second storage section and that the second mode is being selected, the resolution registration section registers, in the first storage section, a subset of resolutions among those stored in the second storage section that are included in the set of resolutions read out from the image display device.

* * * * *